May 5, 1970

C. W. GEER 3,510,714

SOLAR ENERGY CONVERTER WITH TROUGH-SHAPED CATHODE
AND SHIELDED, PLANAR ANODE

Filed May 1, 1967

INVENTOR.
CHARLES WILLARD GEER
BY Lindenberg & Freilich

ATTORNEYS

United States Patent Office 3,510,714
Patented May 5, 1970

3,510,714
SOLAR ENERGY CONVERTER WITH TROUGH-SHAPED CATHODE AND SHIELDED, PLANAR ANODE
Charles Willard Geer, Santa Ana, Calif., assignor to Research Corporation, New York, N.Y., a nonprofit corporation of New York
Filed May 1, 1967, Ser. No. 634,961
Int. Cl. H01j 39/04, 39/06
U.S. Cl. 313—94      6 Claims

ABSTRACT OF THE DISCLOSURE

A solar energy converter of the type wherein electrons are emitted from an illuminated cathode and captured by an anode. A parabolic cathode is employed so that any light not absorbed is concentrated at its focus. An anode is disposed at the center of the cathode with a hole being provided in the anode at the parabolic cathode focus so that light reflected from the cathode does not strike the anode. The anode is constructed of low work function material so it readily absorbs electrons, and there is included a reflective shield on the anode to prevent light from striking it by instead directing it at the cathode.

BACKGROUND OF THE INVENTION

Field of the invention

This invention relates to photoelectric cells, and more particularly to a cell which is particularly useful for generating electricity from sunlight.

Description of the prior art

Protocathode solar energy converters generate electricity when sunlight strikes a cathode, causing it to emit electrons which are captured by an anode. In order to obtain high efficiency in photocathode converters several major requirements must be satisfied. First, the cathode must be highly illuminated so that a large number of electrons are ejected. Second, the anode must be positioned close to the cathode so as to intercept a high proportion of electrons and to reduce space charge effects. Third, the area of the anode must be large for the same reason that it must be close to the cathode—to intercept electrons and reduce space charge. Fourth, the anode must be illuminated as little as possible to reduce the ejection of electrons from it which would reduce forward current flow. Various solar energy converter designs have been used, all of which have had major disadvantage. For example, a gridlike anode can be positioned over the cathode but it casts a shadow and has a relatively small area to intercept electrons. A solar converter which satisfied most or all of the requirements could provide an efficient source of electrical energy.

SUMMARY OF THE INVENTION

One subject of the present invention is to provide an efficient and economical photocathode solar energy converter.

Another object of the invention is to provide a photoemissive energy cell which enables maximum anode capture of electrons emitted by the cathode while providing for a minimum illumination of the anode by direct sunlight or by light reflected from the cathode.

Yet another object of the invention is to provide solar energy converters for use in outer space environments which can be economically manufactured in efficient and reliable arrays.

The foregoing and other objects are realized in arrays of photocathode cells wherein each cell comprises a parabolic cathode for receiving sunlight and emitting electrons and a platelike anode for receiving the electrons. The anode has a hole where it crosses the focus of the parabolic cathode, so that light reflected from the cathode is not absorbed by the anode. The anode also has a cap or shield which reduces its illumination. Because of the assurance of low illumination, the anode is coated with a material of low work function to enable it to readily absorb electrons. In another embodiment of the invention the anode has a reflective coating of very high work function at the focus of the parabolic cathode, to prevent anode emission of electrons instead of a hole.

The novel features that are considered characteristic of this invention are set forth with particularity in the appended claims. The invention itself will best be understood from the following description when read in connection with the accompanying drawings.

DESCRIPTION OF THE PREFERRED EMBODIMENTS

Figure 1:
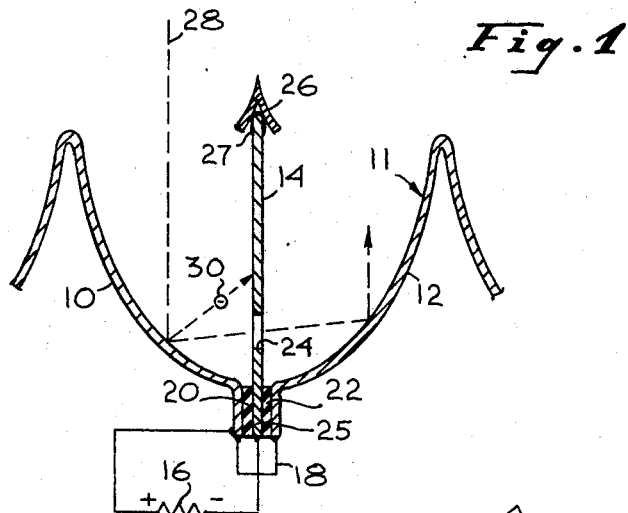
FIG. 1 is a sectional view of a solar energy converter constructed in accordance with the invention.

FIG. 1 illustrates one embodiment of the invention comprising cathode halves 10 and 12, an anode 14, and an electrical load 16 connected between the anode 14 and a cathode half 10. A conductor 18 electrically connects the cathode halves together and insulators 20 and 22 electrically isolate the cathode halves 10 and 12 from the anode. The two cathode halves 10 and 12, which may be collectively referred to as a cathode 11, form a trough-shaped part of a parabola. The anode, which is located within the cathode, that is, within the parabola defined by the cathode has a plate-like or planar form with a hole 24 occupying the region or hand near the focus of the parabolic cathode. An inner end 25 of the anode rests at the bottom of the cathode and a shield 26 caps the outer end 27 of the anode.

The cathode 11 may be constructed of copper, with a coating on the side facing the anode of highly photoemissive, or low work function material such as cesium-antimony. Similarly, the anode 14 may be constructed of copper coated on both sides with a photoemissive material which may also be cesium-antimony. Other photoemissive materials such as cesium-antimony-potassium-sodium combination may be used instead. The shield 26 may be constructed of a high work function material such as nickel, having a highly polished surface to reflect light.

The cells are generally used in a vacuum environment, such a outer space, where there is little interference with the flow of electrons from cathode to anode. Sunlight, indicated by the light ray 28 shines on the photoemissive surface of the cathode. When a photon of the sunlight strikes the cathode it may raise the energy of an electron sufficiently to allow it to escape from the surface of the cathode. The electron indicated at 30 may fly out in any direction and may reach the anode 14 and be absorbed. Of course, the flow of electrons from cathode to anode creates a voltage difference between them and drives current through the load resistor 16 or any other device connected between them.

Sunlight which is not absorbed by the cathode 11 is reflected toward the anode. The cathode surface is smooth rather than diffusive, so most of the nonabsorbed light is reflected toward the parabolic focus. Since there is a hole 24 in the anode at the parabolic focus, reflected light does not reduce the efficiency of the cell but passes through the hole and strikes the other half of the cathode, where it may eject another electron. If the light does not cause the ejection of an electron, it will be directed outwardly in a direction parallel to the incoming rays, and will not strike the anode. Thus, while electrons generally strike the anode where they are readily absorbed, neither direct nor reflected light strikes the anode and few electrons are emitted therefrom; as a result the device has a high efficiency.

The energy converter is generally directed at the sun, that is, the axis of the parabolic cathode is parallel to the rays from the center of the sun so that most rays will be reflected by the parabolic cathode to its focus and most rays will be nearly parallel to the surface of the anode 14. However, since sunlight does not contain only parallel rays (because it has an appreciable apparent diameter) and since there may be some error in orienting the energy converters, provisions are made to maintain a maximum efficiency even for incoming rays not at the optimum angle. The hole 24 in the anode is made large enough that slightly misoriented rays will still pass through it. The shield 26 over the outer end of the anode shields the anode from light rays directed at a small angle to the anode surface instead of parallel to it. The shield directs light which might otherwise strike the anode, against the cathode; the portion of this light which is reflected by the cathode generally strikes the anode, but the amount of light is small and efficiency is decreased only slightly. The shield could have a flat end instead of an arrowhead shape, to reflect all sunlight back toward the sun instead of toward the cathode; however, the overall efficiency of the device generally is increased by the arrowhead shape. The provision of a high work function coating on the shield 26, results in few electrons being ejected from the shield and it can be electrically connected to the anode instead of being insulated from it. Use of a high work function shield which is electrically connected to the anode eliminates the possibility of the shield being highly positive charged and attracting electrons away from the anode.

Figure 2:
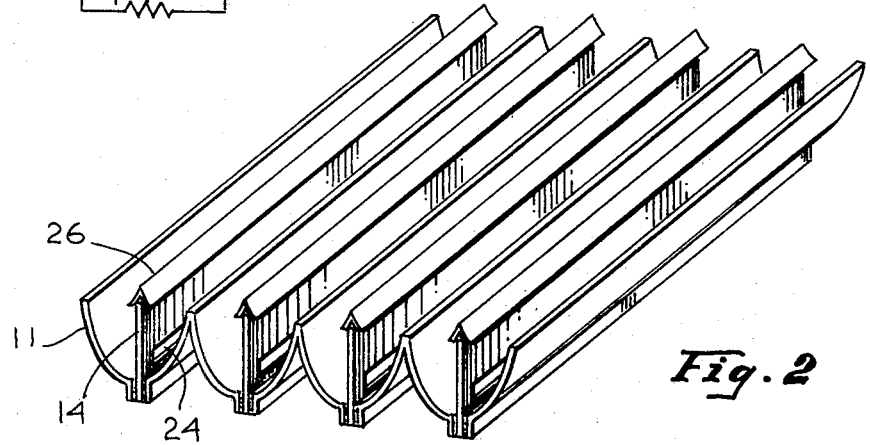
FIG. 2 is an isometric view of an array of energy converters of the type shown in FIG. 1.

The energy converters are generally constructed in an array as shown in FIG. 2. Each member of the array is constructed as shown in FIG. 1. The array may be fabricated from many cathode halves joined together, or may be constructed from a single sheet of material into which parabolic depressions have been formed, as shown in FIG. 3.

Figure 3:
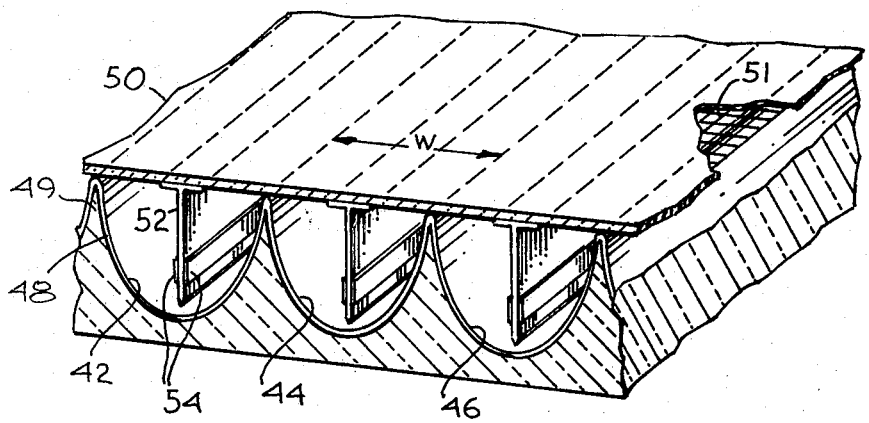
FIG. 3 is a pictorial sectional view of a portion of an array of solar energy converters having cells constructed in accordance with another embodiment of the invention.

In the portion of the array shown in FIG. 3, the cathode is a continuous plate of glass 40 molded with concave depressions such as those indicated at 42, 44 and 46. The sun facing side of the plate has a copper coating 48 to conduct electricity, and the copper is coated with a photoemissive material such as cesium-antimony, this coating extending along the elongated concave depressions except near the highest points such as 49. A cover 50 is disposed over the plate 40 to form a gas-tight enclosure so that a vacuum can exist in the concave depressions, and a screen 51 of metal mesh with very thin wires is molded into the cover. T-shaped anodes 52 are disposed in the concave cathodes, each anode having the top of the T-shape fused to the bottom of the cover 50 and electrically connected to the mesh 51. The stem of the T-shaped anodes extend to near the bottom of the cathodes. Bands 54 of light reflected material are disposed along the anodes at areas to which most of the light striking the cathode will be reflected.

When the concave cathodes 42, 44 and 46 face a light source, that is, the bottom of the cathode is perpendicular to a line extending between the cathode and the light source, most of the light reflected from the cathode will shine on the bands 54 and be reflected back to the cathode. The anodes 52 extend in the direction faced by the cathode, that is the anodes have a surface which is perpendicular to the bottom of the cathode, so that when the cathodes face a light source no light falls on the anodes. The T-shaped top of the anodes prevents light from falling on the anodes when the cathodes are misoriented by several degrees from a light source. The anodes are similar to those described in the first embodiment except that instead of a hole at the focus or the like of the cathodes, there is provided a reflective coating 54 of high work function material such as nickle. The reflective coating 54 reflects light back at the cathode without causing substantial emission of electrons from the anode. Either a hole or a reflective coating may be used; the hole has greater efficiency since it prevents any emissions therefrom, but it weakens the anode structure. Instead of a physical hole, a solid but transparent portion may be disposed at the focus so that light can pass through it. With present day pressed-glass technology, strong yet inexpensive arrays of the type shown in FIG. 3 can be constructed, particularly if cells of a width W of between one millimeter and five millimeters are employed. Various shapes of cells may be used, including crater shaped cathodes instead of cathodes of trough shape.

While particular embodiments of the invention have been illustrated and described, many variations and modifications will occur to persons skilled in the art. Accordingly, the particular embodiments should be considered only as examples, and the scope of the invention is limited only by a just interpretation of the following claims.

What is claimed is:
1. A photoelectric generator comprising:
   a cathode of substantially parabolic cross-sectional shape for reflecting rays parallel to the axis of the parabola to a focal area, said cathode having a surface of photomissive material; and
   a substantially planar anode disposed substantially along the center of said parabolic shape defined by said cathode for receiving electrons emitted from said cathode, said anode including a portion at said focal area of said parabolic cross-sectional shape which is resistant to the photo-emission of electrons and portions on either side of said focal area having a surface which readily absorbs electrons.
2. A photoelectric generator as defined in claim 1 wherein:
   said portion of said anode at said focal area of said parabolic cross-sectional shape comprises a reflective surface portion of high work function material.
3. A photoelectric generator as defined in claim 1 including:
   a shield disposed over an outer end of said anode for shielding said anode from light received at an angle on the order of magnitude of several degrees from the axis of the parabolic cross section of the cathode, said shield having a reflective surface of high work function material.
4. A photoelectric generator as defined in claim 1 wherein:
   said anode is of platelike shape and is disposed along the center of said parabolic cathode; and including a shield disposed over an outer end of said anode and extending along its length, said shield having an arrowhead shaped cross section for reflecting light onto said cathode.

5. A photoelectric generator as defined in claim 1 including:
   a shield disposed over an outer end of said anode for shielding said anode from light received at an angle on the order of magnitude of several degrees from the axis of the parabolic cross section of the cathode, said shield having a reflective surface of high work function.

6. Apparatus for converting from a light source to electrical energy comprising:
   a concave cathode of low work function material;
   a platelike anode disposed at the center of said cathode, said anode having a surface of low work function material, and said anode extending in the direction faced by said cathode for avoiding light when said concave cathode is facing said light source, said anode having an outer edge toward and light source; and
   a shield of arrowhead shape with a reflective surface of high work function material, said shield disposed over said outer edge of said anode to reflect light onto said anode.

References Cited

UNITED STATES PATENTS

| | | | |
|---|---|---|---|
| 2,744,200 | 5/1956 | Taylor | 136—89 X |
| 3,058,022 | 10/1962 | Coleman | 313—96 |
| 3,152,926 | 10/1964 | Power | 136—89 |
| 2,135,615 | 11/1938 | Farnsworth | 313—95 |
| 2,841,728 | 7/1958 | McGee | 313—95 |
| 3,099,764 | 7/1963 | McDonie et al. | 313—95 |
| 3,238,406 | 3/1966 | Greilich et al. | 313—94 |
| 3,263,101 | 7/1966 | Geer | 313—94 X |

OTHER REFERENCES

Enstrom et al.: RCA Technical Notes, RCA TN No. 270, June 1959.

ROBERT SEGAL, Primary Examiner

U.S. Cl. X.R.

310—4; 313—283, 97; 136—89